Aug. 4, 1964    G. T. R. CAMPBELL ETAL    3,143,224
APPARATUS FOR THE LOADING AND UNLOADING OF SHIPS
Filed May 16, 1961    6 Sheets-Sheet 1
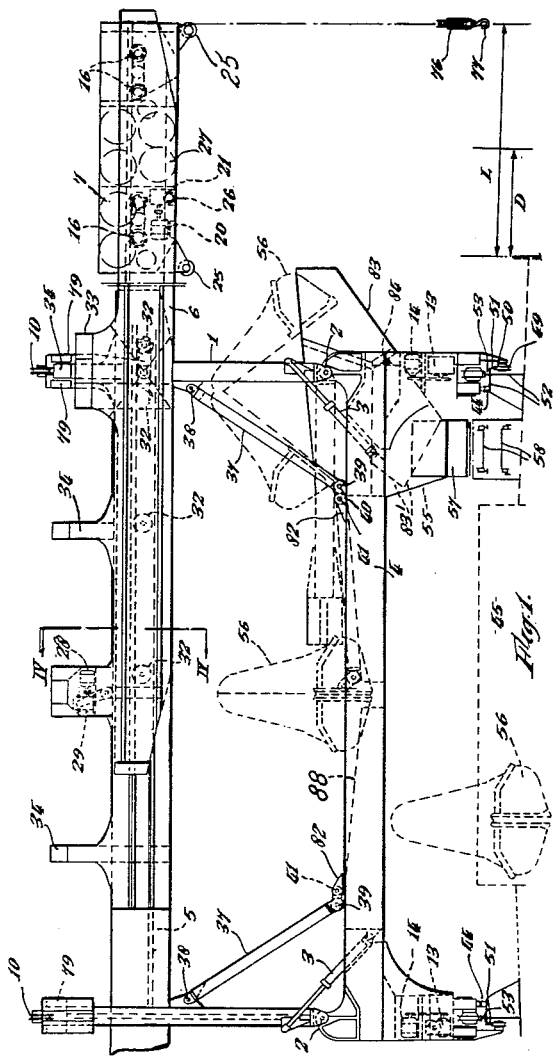
INVENTORS
GEORGE THOMAS RICHARDSON CAMPBELL
NORMAN VERNON LASKEY
THOMAS BENTHAM HEMSLEY
BY
*Kenyon & Kenyon*
ATTORNEYS

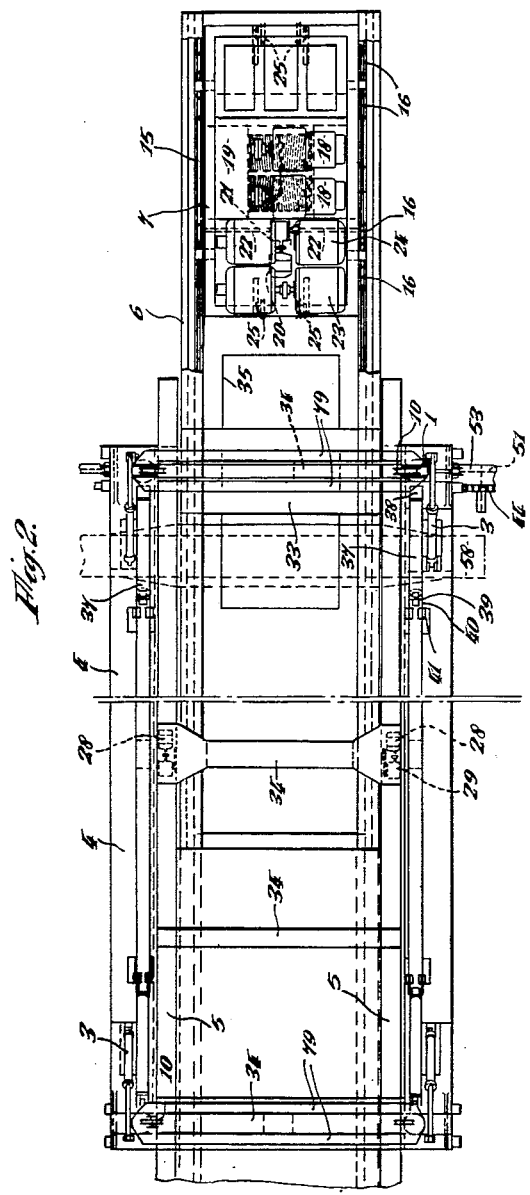

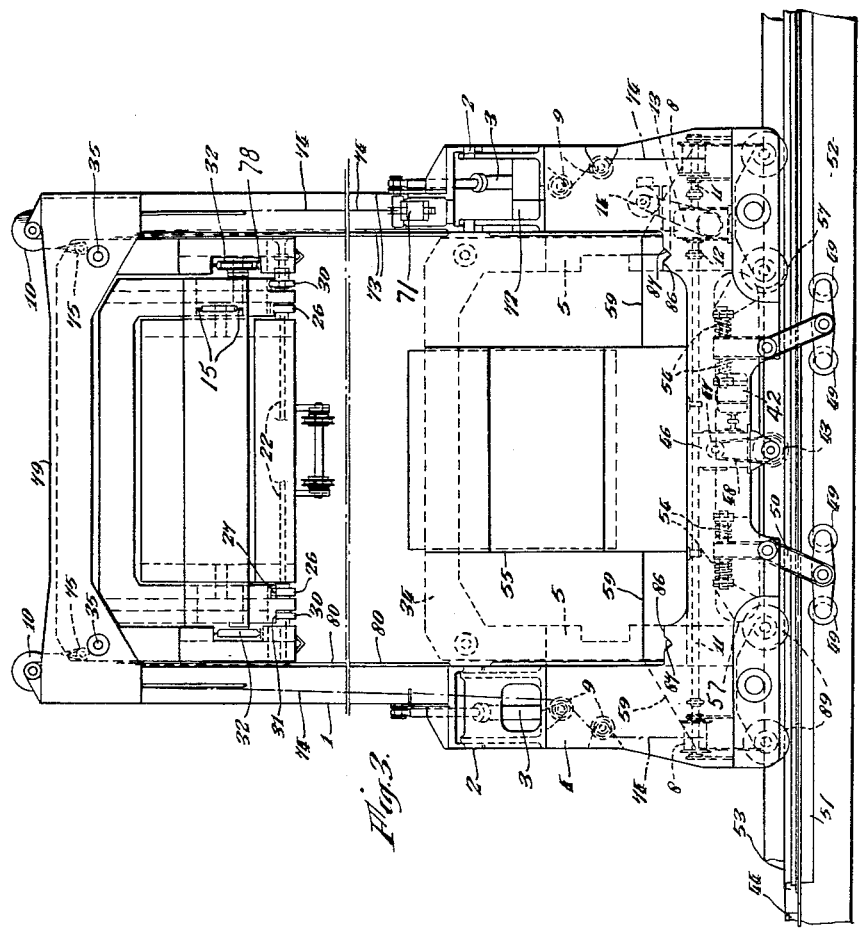

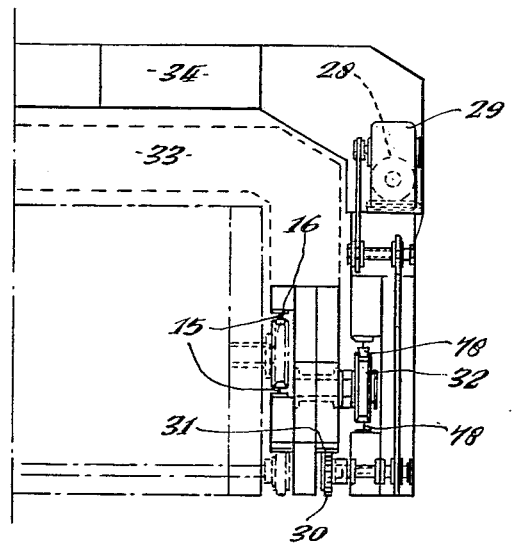
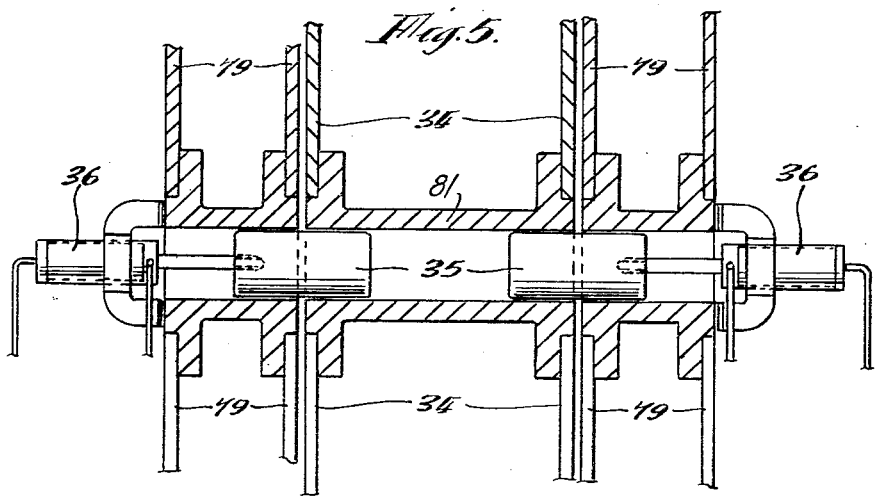

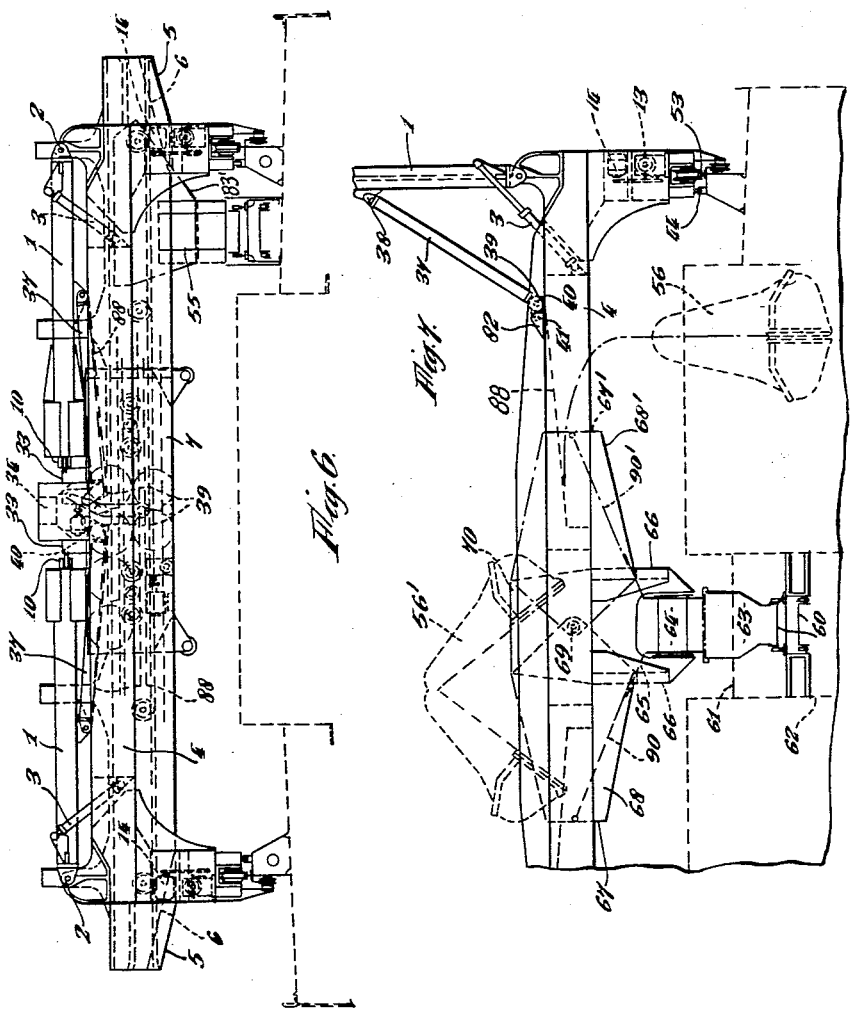

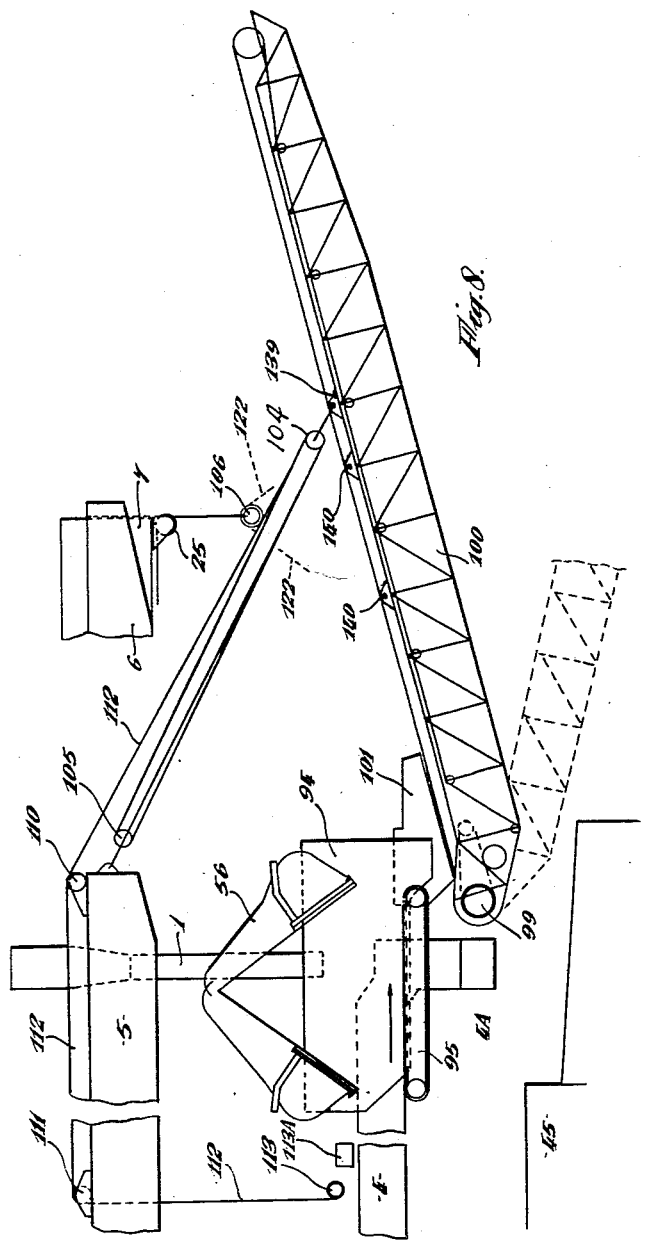

United States Patent Office 3,143,224
Patented Aug. 4, 1964

3,143,224
APPARATUS FOR THE LOADING AND
UNLOADING OF SHIPS
George Thomas Richardson Campbell, Montreal, Quebec, and Norman Vernon Laskey, St. Lambert, Quebec, Canada, and Thomas Bentham Hemsley, South Gosforth, Newcastle-upon-Tyne, England, assignors to International MacGregor Organization (I.M.G.O.), Monte Carlo, Monaco, a body corporate of Monaco
Filed May 16, 1961, Ser. No. 110,365
Claims priority, application Great Britain May 21, 1960
9 Claims. (Cl. 214—15)

This invention relates to apparatus to be installed on a ship for use in the loading into and unloading from the ship's hold of all types of cargo capable of being lifted by a crane hook, a grab or the like, or a magnetic appliance such as goods packed in cases, containers or bags, or stocked on pallets, cut timber or logs, or pipes or rails (which for convenience will be referred to as unit cargoes), or bulk cargoes of granular or lumpy materials or scrap metal.

It is known to provide, on a ship's deck, loading and unloading apparatus comprising a transverse bridge, displaceable on rails extending lengthwise of the deck, with a hinged portion at each side capable of being raised for extension of the bridge so as to enable a crab running upon said bridge when extended to transport cargo from the ship's holds to a wharf or lighters alongside which the ship is moored, or from the wharf or lighters to the holds.

An object of the invention is to provide improved loading and unloading apparatus comprising a mobile bridge affording a wide range of operation (a) for the direct transfer of bulk cargoes by means of a grab or of unit cargoes by means of a crane hook between the ship's holds and a wharf or lighters alongside which the ship is moored, or (b) for the unloading of bulk cargoes from the ship's holds by means of a grab for delivery to a shipboard discharge conveyor system, and such that the bridge when not in use (that is, at all times while the ship is at sea) does not add to the ship a heavy load at a height above deck such as to render the ship unstable or unsafe in a seaway.

Another object of the invention is to provide a mobile bridge as aforesaid which offers a minimum of wind-resistance when out of use, and which may if desired be stowed inside a deck superstructure, for example, below a forecastle or poop deck, or in a midships deck house.

The invention provides loading and unloading apparatus for installation on a ship, comprising a wheeled carriage adapted to be displaced on rails extending lengthwise of the ship's deck, and a bridge which provides a transverse runway for a crane crab and is so supported on said carriage as to be capable of elevation when required fro use and of being lowered into or upon the carriage for stowage when out of use.

From another aspect, the invention provides loading and unloading apparatus for installation on a ship having rails extending lengthwise of its deck at both sides of said deck, comprising a rectangular wheeled carriage displaceable on said rails, two pairs of columns located one at each side of said carriage, said columns being mounted to be erected and locked in their erect positions or unlocked and lowered as required, a bridge providing a transverse runway for a crab, and means for elevating said bridge to be supported upon said columns when required for use and for lowering said bridge into or upon said carriage for stowage when out of use.

Said columns may be pivoted to be erected and lowered by angular displacement. For example, said carriage may support at each side two pivotal mountings for the lower ends of a pair of said columns, said mountings being disposed to enable angular displacement of said columns from an erect attitude to a horizontal attitude upon or within transverse members of said carriage, with means displaceable relative to said transverse members for bracing said columns when erected, and actuator means for the angular displacement of said columns.

In an alternative arrangement, said columns may be vertically displaceable relative to said carriage, and each column may consist wholly or in part of telescopic elements, whereby the vertical length of the columns is reducible as or when they are lowered relative to said carriage.

The bridge may be removably securable to the upper part of said columns, when erected, means being associated with said columns for elevating said bridge after erection of the columns and lowering said bridge prior to lowering of the columns.

In apparatus as aforesaid, the carriage may comprise motive power means and drive means whereby the carriage is displaceable upon said ship's deck rails. Holding-down rollers may be provided at each side of the carriage to engage below an inverted rail or flange associated with each of the running rails, with linkage means supporting said rollers and resiliently loaded to permit limited vertical movement thereof.

Advantageously the bridge may comprise a main transverse frame, a supplementary telescoping frame, and rails on said frames whereby a crane crab is supported so as to be displaceable beyond said columns to overhang either side of the ship.

The crab may be arranged to house drums for hoisting and closing ropes for a grab, and also have at each end a pair of pulleys over which one of said ropes can be reeved for passing around a pulley in a hook block, whereby said hook is transportable by the crab to a maximum reach beyond either end of the bridge.

In an apparatus as aforesaid, fore-and-aft lateral members of a rectangular carriage may be provided each with an anchorage, on or adjacent the transverse centre line of the bridge, for the inner end of an overside discharge conveyor, such conveyor being adapted to be supported and luffed by two multiple purchases of which the inner and upper pulley blocks are adapted to be anchored to one of two pairs of anchorages provided at the ends of the main frame of the bridge, said overside conveyor preferably including its own belt driving motor. The carriage may be adapted to support upon either of its fore-and-aft lateral members a hopper, of a size to permit substantial opening thereover of a grab, said hopper comprising a transversely extending apron belt feeder and its driving means, for feeding material discharged by the grab to a feed chute attached to the inner end of the boom of the overside conveyor.

The invention also extends to a ship equipped with loading and unloading apparatus comprising a displaceable bridge as aforesaid, and having a deck superstructure adapted to house said bridge when lowered for stowage.

An embodiment of the invention will be described by way of example with reference to the accompanying drawings wherein:

FIG. 1 is a front elevation of the loading apparatus mounted on a ship's deck with the bridge erected and extended.

FIG. 2 is a plan view of the same,

FIG. 3 is a side elevation of the same,

FIG. 4 is a section on the line IV—IV of FIG. 1,

FIGURE 5 is a partially sectionalized front elevation on a larger scale than that of FIGURE 1 showing structure of the wheeled carriage of the loading apparatus.

FIG. 6 is a front elevation of the loading apparatus with the bridge centralised and collapsed for stowage.

FIG. 7 is a fragmentary front elevation of the apparatus mounted on another type of ship's deck, and FIG. 8 is a diagrammatic front elevation of a modification of the apparatus shown in FIG. 1.

As shown primarily in FIGS. 1–3 of the drawings, four tubular supporting columns 1 arranged in pairs at the sides of the apparatus are mounted on hinge pins 2 so as to be lifted into the upright position or lowered to the horizontal position by means of hydraulic actuators 3 powered by an electric motor driven hydraulic pump unit mounted on the main rectangular carriage 4.

The bridge comprises three components, namely a primary bridge frame 5, an inner telescoping frame 6 and a crab 7 which travels on tracks mounted on the telescoping frame 6. The entire bridge assembly is adapted to be raised and lowered by means of the multiple purchase blocks 71 (FIG. 3) located in the columns and 72 located in the main carriage 4 and controlled by hoisting drums 8 located in fore-and-aft structural members of said carriage. Guide pulleys 9 are located below the lower blocks 72 of the multiple purchase in order to guide the wire ropes to the hoisting drums. The moving block 71 of each multiple purchase is constrained to run true in relation to the fixed block and thus avoid crossing of the wire rope falls by being mounted in guides 73 attached to the inside of the supporting column.

At the top of each supporting column is mounted a pulley 10 over which each hoisting cable 74 from the multiple purchase blocks is reeved and connected to an anchorage 75 on the main bridge frame 5. The pair of hoisting drums 8 on one side of the main carriage are as shown in FIG. 3 connected by drive shafting 11 and flexible couplings 12 to a single reduction worm and worm wheel speed reducer 13 driven by an electric motor 14. The two electric motors 14 are of the reversible type arranged for synchronised starting and stopping. For instantaneous stopping and braking of the bridge assembly in any position, electric solenoid brakes are fitted to each bridge hoisting motor 14.

On the telescoping member 6 of the main bridge, the crab 7 is mounted on four pairs of wheels 16 located on pin jointed frames and constrained to run between upper and lower rail tracks 15. The operator's cab is underslung from the crab, and electric motors 18 and gearing 19 for the hoisting and closing drums installed for servicing a grab, travel motor 20, gearing 21 and drive shaft 22 for crab traverse, Ward Leonard motor generators 23 and 24, transformers, switchgear and starters are all as shown in FIG. 2 mounted on the crab. The hoisting and closing motors and motor control equipment may be suitable for operating a 7-ton grab when the vessel is handling bulk cargoes either loading or discharging into or from the hold directly from or to an apron on the quay, or lighters, or railway wagons, trucks or a travelling hopper on the quay. The practical outreach of the telescoping frame 6 from the ship's side when the unit is operated in association with a 7-ton grab is the distance D which may be 10–15 feet. When handling general cargo, the grab may be detached and the wire ropes from either the closing or hoisting barrels reeved through a pair of pulleys 25 located at one or other of the extreme ends of the crab, depending on which side of the vessel cargo is to be worked, and through a pulley in a block 76 carrying a hook 77 so that the outreach L is increased to about 20′0″ at which distance a load of 5 tons can be lifted from the quay or a lighter and loaded into the ship's hold or alternatively lifted out of the hold and unloaded ashore.

The crab is traversed by a pair of pinions 26 located at each side upon the shaft 22 and engaging with racks 27 secured to the telescoping frame 6.

The telescoping frame 6 is traversed relative to the main frame 5 by two reversible electric motors 28 (FIGS. 2–4) located in a middle fixed arched structural member 34 of the primary bridge structure 5 said motors being arranged for synchronised starting and stopping, and each driving through a worm and worm wheel speed reducer 29 and roller chains a pinion 30 which engages a rack 31 attached to the telescoping frame 6. The telescoping frame 6 is supported on a system of wheels 32 running between upper and lower rails 78 on the primary frame 5 and so arranged that regardless of whether the telescopic frame is fully extended outboard in either direction there are at least four wheels supporting the weight of the crab and telescoping frame at all times. In order to provide structural rigidity to the telescoping frame 6 one arched cross member 33 is provided above its middle. The height of the arch 33 is such as to permit travel of the crab from end to end of said frame 6, and also such that it can pass below and through the arched members 34 of the main bridge frame 5 the purpose of which is to provide structural rigidity.

Each two tubular supporting columns 1 of the bridge, located as a pair at either side of the main carriage 4, are cross-connected at their upper ends by a heavy, arched, double structural member 79. On the periphery of the tubular columns guide bars 80 are welded in order to guide the primary bridge frame 5 during raising and lowering thereof.

When fully raised the primary bridge frame 5 is attached to each of the arched structural members 79 connecting the tubular columns by means of four locating pins 35, thereby relieving the load on the multiple purchase blocks 71, 72 and hoisting drums 8. The locating pins 35 are inserted in and withdrawn from bushes 81 in the end arch members 34 of the main frame 5 by individual hydraulic actuators 36 (see FIG. 5) thereby eliminating any need for manual operation on the part of the ship's crew, when setting-up or lowering the bridge.

Each tubular column 1 is provided with a tubular strut 37 one end of which is connected to the column at about mid-height by a hinge pin 38. The other end is provided with a roller 39 and lugs 40 having eyes to register with eyes in brackets 82 on the transverse beams of carriage 4 when the columns are erected and through which a stopper pin 41 is inserted to hold the columns in the erect position.

The main carriage 4 on which the bridge is mounted is driven in the fore-and-aft direction on the ship's deck rails 53 by two reversible electric motors 42 (FIG. 3) arranged for synchronised operation. The motors are located in each of the fore-and-aft members of the main carriage 4. The drive to each of the pinions 43, which engage the deck mounted racks 44 on either side of the main hatch 45 in a fore-and-aft direction, is by way of a worm and worm wheel speed reducer 46, sprocket wheels 47 and roller chain 48.

In order to provide stability to the bridge structure when operating, two pairs of inverted or trod rollers 49 suspended by a robust pivoted link 50 are attached to the fore-and-aft members of the main carriage 4. These rollers engage below a flat bar track 51 welded to the underside of the top flange of each deck girder 52 on which the main carriage rail tracks 53 are laid. The upper end of the pivoted link 50 from which the rollers 49 are suspended is spring loaded by a pair of heavy buffer springs 54. The spring loading ensures that a constant pressure is exerted by these rollers against the bar track 51, which enables the carriage to travel freely over irregularities which will necessarily exist in the track over the length of the main deck, particularly towards the fore and after ends which sheer exists on the main deck. This arrangement also enables travel of the bridge when a load is suspended from the crab 7 with the telescoping frame 6 in the fully extended position.

When it is desired that the unloading bridge should be used in connection with one or more fixed overboard discharge points which necessitates the installation of a system of continuous belt conveyors, the main carriage 4 is equipped with a hopper 55, which has a capacity of about 350 cubic feet, into which bulk cargo can be dumped by a grab 56'. At the base of the hopper an apron feeder 57 is provided for controlling the rate of discharge from the hopper on to a belt conveyor 58 which in FIGURE 1 is shown located on the main deck extending fore-and-aft on one side of the hatch 45'. The upper section 83 of the hopper is arranged to turn inwards about a pivot 84 and stow away within the main section as shown by chain-dot lines 83'. The side elevation of this hopper arrangement, which also shows the apron feeder 57 and discharge hoods 59, is illustrated in FIGURE 3. Two such hoppers can be fitted, one on either side of the bridge, in which case the continuous belt conveyor 58 which is shown fitted on one side of the hatch along the main deck in a fore-and-aft direction will be duplicated on the other side. Alternatively when the unloader is used on combined solid liquid bulk carriers which are designed with underdeck trunks, the continuous conveyor belts 58 can be located in the trunks, bulk cargo being discharged by the apron feeder 57 from the hopper, by way of suitably sized openings provided in the main deck above the trunk, to the continuous belt conveyor 58.

The disposition of the various components of the bridge when lowered for stowage is shown in front elevation in FIG. 6. The telescoping frame 6 is centralised so that its ends coincide with the ends of the main bridge frame 5, the crab 7 is brought to the middle of the bridge, and the upper section 83 of the hopper 55 is turned inside the main section thereof as described, the grab having been stowed on deck at a suitable location and detached if necessary. The bridge support pins 35 are then withdrawn by means of their actuators 36, and the hoisting motors 14 are operated to drive the shafts 11 in synchronism in the appropriate directions to pay out the hoisting cables 74 from the drums 8, and thereby to lower the main bridge frame 5 until it comes to rest with the ends of its transverse girders supported by platforms 86 (see FIG. 3) at the ends of the fore-and-aft members of the main carriage 4, below the hinge pins 2 of the columns 1, and firmly located by V-grooves 87 in said platforms. By withdrawing the stopper pins 41 from the lugs 40 at the feet of the struts 37, these are released so that the rollers 39 can move inwards down inclined runways 88 as the pairs of columns 1 are turned inwards and downwards, by retraction of the piston rods of the hydraulic actuators 3, to horizontal positions above the transverse members of the carriage 4 as shown in FIG. 6. It will be observed that in this collapsed disposition, the arch cross member 33 of the telescoping frame 6 is nested below the middle arch cross member 34 of the main bridge frame 5 and of the arch members 79 of the pairs of columns 1 are housed at each side of said arch members 33 and 34.

When the unloading bridge is fitted to a vessel designed as an "Open Ship," that is with two hatches abreast for each hold, as shown in FIG. 7, the space between the two hatches below the main deck 61 is enclosed by a trunk 62 in which a continuous belt conveyor 60 is installed. An opening is provided in the main deck 61 between the hatches, the length of which is equivalent to the length of the hatch, and guide plates 63 are fitted to direct bulk cargo discharged by an apron feeder 64 from a hopper 65, which is now centrally located within the confines of the main carriage 4, to the continuous belt conveyor 60 located in the centre trunk. The hopper 65 and apron feeder 64 are supported by an additional fore-and-aft structural member 66 built into the main carriage 4. The upper section 67 of the hopper is formed as a stirrup with pentagonal side plates 68 turnable through 180° about horizontal pins 69 between fixed trapezoidal end plates 70, with a pivoted transverse plate 90 adapted to fall so as to be supported at its inner end on the wings of the hopper 65 and at its sides upon fillets (not shown) attached to the side plates 68, as a floor for said upper laterally extending section of the hopper.

Depending on which side of a cargo hold is being unloaded by means of a grab, said upper section of the hopper is displaced to leave the hatch at that side clear for the lowering and lifting of the grab. Thus, when as shown in FIG. 7, the right hand hatch is open for discharging bulk cargo, by means of the grab 56, said upper section 67 is turned over to the left hand side as shown in full lines, permitting the grab to be lowered and lifted adjacent the inner side of the hatch, and displaced to left of centre and fully opened as shown at 56' for discharging bulk material into the hopper and thence to the central conveyor 60. Evidently when cargo is being unloaded through the left hand hatch, the upper section of the hopper is turned over to right of centre, the parts thereof assuming the positions 67', 68', 90' as shown in chain-dot lines.

This arrangement is such that the hopper assembly and apron feeder do not interfere with the lowering of the bridge. When the upper section of the hopper is located to either side of centre, the crab 7 can be stowed on the other side of the centre line.

FIG. 8 shows diagrammatically a modification of the arrangement described with reference to FIGS. 1–3. In this modification, there is provided on the outer side of each of the fore-and-aft members 4A of the carriage 4, a pivotal anchorage on a horizontal axis 99 for the inner end of the boom 100 of an overside belt discharge conveyor, which comprises as indicated its own belt driving means. This overside conveyor boom 100 is adapted to be supported and luffed about the pivotal axis 99, at either side of the carriage 4, by two multiple purchases. The outer pulley blocks 104 of these are anchored to lugs 139 on the boom somewhat beyond the middle of its length, while the inner and upper pulley blocks 105 are anchored at the corners of the main bridge frame 5. Pulleys 110 and 111 are provided, respectively upon each corner of the bridge frame 5, and at the middle of each transverse beam thereof, for guiding the cable 112 of each multiple purchase to a luffing drum 113 operable by a motor 113A, located at the middle of each of the transverse members of the carriage 4.

A hopper 94, of a size to permit substantial opening thereover of a grab 56, as shown, is removably supported between either end pair of columns 1 of the bridge. This hopper comprises a transversely extending apron belt feeder 95 (and its driving means not shown) whereby material discharged by the grab is fed to a receiving chute 101 attached to the inner end of the conveyor boom 100.

By means of such an arrangement, bulk cargo lifted from a hold through a hatch 45 by the grab 56 can be discharged immediately over the side of the ship to a substantial distance, for example, 60 feet on to a wharf.

The down haul run of each cable 112 from the pulley 111 to the drum 113 passes outside the transverse beam of the main bridge frame 5, in order to permit free displacement within said frame of the inner telescoping frame 6. The leads of the cables 112 between the blocks 104 and the pulleys 110 are skewed to suit variation of the block centres during luffing, since the pulleys 110 (and also the upper blocks 105) may, for example, be about 16 feet apart while the blocks 104 may be about 4 or 5 feet apart. The convergence of the pair of cables 112 towards the pair of pulley blocks 104 does not impede operation of the crab 7 running in the telescoping frame 6 since in this arrangement it is not necessary to displace the grab 56 transversely beyond the position thereof shown in relation to the hopper 94.

Said hopper 94 may be provided with lifting lugs (not shown) whereby the hopper as a unit with the apron feeder 95, can (after the grab has been stowed) be lifted by slings from a crane hook 77 hanging on a rope, from the hoisting drums or the closing drums mounted in the crab 7, reeved over a pair of pulleys 25 mounted below the end of the crab as described with reference to FIGS. 1–3. Said hopper may thus be deposited in a suitable location while the conveyor boom 100 is being transferred to a stowed location. Such transfer of the conveyor boom may be effected by lowering it to a horizontal attitude by means of the cable 112, attaching to lugs 140 on the boom slings 122 suspended from a pulley block 106 carried by said rope reeved over the pulleys 25, or by the crane hook 77 supported by said rope, so that the boom is suspended from the crab, and detaching the pulley blocks 104, 105 from their anchorages, and the boom 100 from its pivotal anchorage 99. The boom can then be swung as required in the horizontal plane, and manoeuvred by operation of the telescoping frame 6 and crab 7 to any desired location on the ship for stowage, if necessary including passing the boom transversely through the pair of columns 1 into the space between the carriage 4 and main bridge frame 5.

When it is desired to erect the overside conveyor again on either side of the carriage 4 similar operations can be performed in reverse sequence, the pulley blocks 105 of course being anchored at the corresponding end of the bridge frame 5 and the cables 112 being suitably passed around the pulleys 111 and over the pulleys 110 at the corners of said end of the frame 5.

In an alternative arrangement of means for raising and lowering the bridge (which is not illustrated), there may be provided in place of the hinged columns 1, two pairs of vertical columns which are displaceable vertically with respect to the main carriage. These columns may be of fixed length, and adapted to be raised and lowered by any suitable means, such as hoisting cable means as above described, or by racks secured to the columns and engageable by pairs of pinions on shafts extending alongside or though the fore-and-aft members of the carriage 4, like the shafts 11 illustrated in FIG. 3. Alternatively such vertical columns may consist solely or in part of telescopic elements, so that the vertical length of the columns can be reduced as or when they are lowered relative to said carriage; the telescoping of the column elements may be effected for example by rack-and-pinion means, or by hydraulic means.

The bridge member in such a modification may be permanently secured to the upper ends of the pairs of columns, or such columns may incorporate hoisting gear whereby the bridge member may be separately raised after the columns have been erected and lowered upon the main carriage before the columns themselves are lowered.

In such an arrangement, it is evidently required to provide wells in the ship's deck to receive the vertically displaceable columns when they are lowered. These wells may of course be provided for the or each bridge at a single position where the bridge is to be collapsed when out of use.

The feature of a collapsible bridge according to the invention enables the bridge, when installed on a suitably constructed ship, to be stowed within a superstructure on the deck. For example the bridge may be housed in a space below a forecastle deck or a poop deck, or when a vessel having a midships superstructure is provided with two such bridges, at least one of them may be housed in a space within such a structure. Evidently the bridge is to be collapsed as above described before being longitudinally displaced by its own width into the housing compartment; in the case where the legs are vertically displaceable as in the modification last described, the wells in the ship's deck to receive these columns would have the form of slots of sufficient length to enable such final displacement of the bridge.

The invention evidently also extends to a ship when fitted with at least one collapsible bridge according to the invention, and having a deck superstructure adapted to house said bridge when collapsed for stowage.

What we claim and desire to secure by Letters Patent is:

1. Loading and unloading apparatus installed on a ship, comprising rails extending lengthwise on either side of a ship's deck, a rigid rectangular wheeled carriage spanning hatch openings on the ship's deck, displaceable lengthwise of the ship on, and guided by said rails, and a transverse bridge with a runway and a crane crab for lifting cargoes, means provided on said carriage to raise and support the bridge for use and for lowering it for storage when out of use and comprising also on each side of the ship's deck a pair of columns cross-connected at their upper ends by an arched member, so forming on either side of the ship's deck a gantry, said two gantries being pivotally mounted at their bottom ends in order to allow them to be folded down athwartship, i.e., towards each other for resting upon said carriage and means provided for raising said bridge when said gantries are in their erected positions.

2. Apparatus according to claim 1 comprising hydraulic jacks to raise said columns from their horizontal positions to their vertical position, and for braking their return at horizontal positions.

3. Apparatus according to claim 1 comprising pins and struts, the ends of which are each provided with an eye for connection by means of one of said pins at the upper end, on a column and at the lower end, on said carriage.

4. On a ship, a loading and unloading apparatus comprising rails on said ship, a wheeled carriage spanning hatch openings on the ship's deck, said carriage being displaceable on the ship and guided by said rails, winch means on said carriage, columns pivotally connected to said carriage at their bottom ends in order to allow them to be folded down, hydraulic jacks pivotally connected each at one end to said carriage and at the other end to a corresponding column, means for locking the columns in their erected positions, a horizontal bridge with means cooperating with other means on the column in slidable vertical relationship when said columns are in erected conditions, a pulley at the top of each column, hoisting cables reeved over said pulleys and attached at one end to said winch means on said carriage and attached at the other end to said bridge, and means for locking said bridge in raised condition, at the top of said columns.

5. Loading and unloading apparatus installed on a ship, comprising rails extending lengthwise on either side of a ship's deck, a rigid rectangular wheeled carriage spanning hatch openings on the ship's deck, displaceable lengthwise of the ship on, and guided by the rails extending lengthwise on either side of the ship's deck, and a bridge extending transversely of the ship with a runway and a crane crab for lifting cargoes and including crab elevator means, on each side of the ship's deck an arched member and a pair of columns cross-connected at their upper ends by the arched member, so forming on either side of the ship's deck a gantry, said two gantries being pivotally mounted on the carriage at their bottom ends in order to allow them to be folded down athwart ship, i.e. towards each other for resting upon said carriage and means provided for raising said bridge on said columns when said gantries are in their erected positions, and lowering it for stowage when out of use.

6. Loading and unloading apparatus installed on a ship, comprising rails extending lengthwise on either side of a ship's deck, a rigid rectangular wheeled carriage spanning hatch openings on the ship's deck, displaceable lengthwise of the ship on and guided by said rails, a bridge extending transversely of the ship with a runway and a crane crab for lifting cargoes and including crab elevator means, at least four columns pivotally mounted on said carriage for supporting said bridge in an upper position with respect to said carriage, means to raise and lower said columns, means to raise and to lower said bridge up and down said columns when the latter are in raised position, respectively, for use and stowage, and means for maintaining and locking said bridge in its upper position.

7. Loading and unloading apparatus installed on a ship comprising rails extending lengthwise on either side of a ship's deck, a rigid rectangular wheeled carriage spanning hatch openings on the ship's deck, displaceable lengthwise of the ship on and guided by said rails, a bridge extending transversely of the ship with a runway and a crane crab for lifting cargoes, and including crab elevator means, columns pivotally mounted on said carriage for supporting said bridge in an upper position with respect to said carriage, means to raise and to lower said bridge on said columns with respect to said carriage, respectively, for use and stowage, means for maintaining and locking said bridge in its upper position, and means for raising said columns to a vertical position for use and for swinging them down to a stowage position over said previously lowered bridge.

8. Loading and unloading apparatus installed on a ship, comprising rails extending lengthwise on either side of a ship's deck, a rigid rectangular wheeled carriage spanning hatch openings on the ship's deck, displaceable lengthwise of the ship on and guided by said rails, a bridge extending transversely of the ship, a runway thereon and a crane crab for lifting cargoes and including crab elevator means, at least four columns pivotally mounted on said carriage for supporting said bridge in an upper position with respect to said carriage, means to raise and lower said columns, means to raise and to lower said bridge up and down said columns when the latter are in raised position, respectively, for use and stowage, and means for maintaining and locking said bridge in its upper position, another runway carried by said bridge itself, and a part on said bridge which may extend overboard and which is movable on said another runway that is carried by said bridge itself.

9. Loading and unloading apparatus installed on a ship, comprising rails extending lengthwise on either side of a ship's deck, a rigid rectangular wheeled carriage spanning hatch openings on the ship's deck, displaceable lengthwise of the ship on and guided by said rails, a bridge extending transversely of the ship, a runway thereon and a crane crab for lifting cargoes and including crab elevator means, at least four columns pivotally mounted on said carriage for supporting said bridge in an upper position with respect to said carriage, means to raise and lower said columns, means to raise and to lower said bridge up and down said columns when the latter are in raised position, respectively, for use and stowage, and means for maintaining and locking said bridge in its upper position, said apparatus including a deck superstructure adapted to house said wheeled carriage when said bridge is in its lower position for stowage.

References Cited in the file of this patent

UNITED STATES PATENTS

| | | |
|---|---|---|
| 1,565,875 | Von Haase | Dec. 15, 1925 |
| 1,764,941 | Edson | June 17, 1930 |
| 1,808,862 | Peterson | June 9, 1931 |
| 2,077,895 | Perazzoli | Apr. 20, 1937 |
| 2,396,143 | Andersen | Mar. 5, 1946 |
| 2,490,609 | Andersen | Dec. 6, 1949 |
| 2,772,004 | Noble | Nov. 27, 1956 |
| 2,827,181 | Bartenfeld | Mar. 18, 1958 |

FOREIGN PATENTS

| | | |
|---|---|---|
| 1,084,473 | France | Jan. 19, 1955 |